United States Patent [19]

Kern et al.

[11] Patent Number: 5,720,029

[45] Date of Patent: Feb. 17, 1998

[54] ASYNCHRONOUSLY SHADOWING RECORD UPDATES IN A REMOTE COPY SESSION USING TRACK ARRAYS

[75] Inventors: Robert Frederic Kern; William Frank Micka, both of Tucson, Ariz.; Claus William Mikkelsen, San Jose; Robert Wesley Shomler, Morgan Hill, both of Calif.; Warren Keith Stanley, Tucson, Ariz.; Richard Kent Treiber, San Jose, Calif.

[73] Assignee: International Business Machines Corporation, Armonk, N.Y.

[21] Appl. No.: 506,490

[22] Filed: Jul. 25, 1995

[51] Int. Cl.⁶ .................................................. G06F 11/00
[52] U.S. Cl. ........................................................ 395/182.18
[58] Field of Search ........................... 395/182.18, 439, 395/200.01, 200.09, 489; 364/270.5; 370/91, 216, 242, 254

[56] References Cited

U.S. PATENT DOCUMENTS

| | | | |
|---|---|---|---|
| 5,263,154 | 11/1993 | Eastridge et al. | 395/575 |
| 5,280,611 | 1/1994 | Mohan et al. | 395/600 |
| 5,375,128 | 12/1994 | Menon et al. | 371/40.1 |
| 5,375,232 | 12/1994 | Legvold et al. | 395/575 |
| 5,379,398 | 1/1995 | Cohn et al. | 395/425 |
| 5,398,331 | 3/1995 | Huang et al. | 395/575 |
| 5,440,727 | 8/1995 | Bhide et al. | 395/444 |
| 5,504,861 | 4/1996 | Crockett et al. | 395/182.11 |
| 5,544,347 | 8/1996 | Yani et al. | 395/489 |
| 5,555,371 | 9/1996 | Duyanovich et al. | 395/182.11 |
| 5,574,950 | 11/1996 | Hathorn et al. | 395/861 |
| 5,577,222 | 11/1996 | Micka et al. | 395/439 |
| 5,592,618 | 1/1997 | Micka et al. | 395/185.07 |
| 5,594,900 | 1/1997 | Cohn et al. | 395/600 |
| 5,615,329 | 3/1997 | Kern et al. | 395/182.04 |

OTHER PUBLICATIONS

IBM TDB, V. 29, n. 11, Apr. 1987, p 4816, "DASD Update Processing".
IBM TDB, V. 36, n. 03, Mar. 1993, pp. 483–486, "Fast Dual Write".
IBM TDB, V. 37, n. 04B, Apr. 1994, pp. 29–31, "Fast Zeroing of a Storage Device".

*Primary Examiner*—Robert W. Beausoliel, Jr.
*Assistant Examiner*—Stephen C. Elmore
*Attorney, Agent, or Firm*—R. M. Sullivan

[57] ABSTRACT

A disaster recovery system providing asynchronous remote data shadowing between a primary and a secondary site uses a pair of track arrays for each primary data storage device of a remote copy pair to monitor which record updates are in transit between the primary site and the secondary site. A host processor at the primary site of the disaster recovery system transfers a sequentially consistent order of copies of record updates to the secondary site for back-up purposes. The copied record updates are stored on the secondary data storage devices which form remote copy pairs with the primary data storage devices at the primary site. One track array, the active track array, is used to set elements according to which tracks on the primary data storage device receive record updates from the host processor at the primary site. The other track array, the recovery track array, designates which record updates comprise the copied record updates currently transferred from the primary site to the secondary site for data shadowing and is used for recovery should an error interrupt the transfer. The track arrays are toggled once the consistency group transfer completes, the recovery track array becoming the active track array and the active track array becoming the recovery track array.

18 Claims, 9 Drawing Sheets

ASYNCHRONOUSLY SHADOWING RECORD UPDATES IN A REMOTE COPY SESSION USING TRACK ARRAYS

FIELD OF THE INVENTION

The present invention relates generally to disaster recovery in data processing systems, and more particularly, to a method and apparatus for marking which tracks on a data storage device are updated by an application running in a host processor at the primary site, wherein the updated records subsequently need to be transferred in a consistency group to the secondary site. Marking the updates to tracks on each data storage device at the primary site allows recovery of the consistency group should an error interrupt the data transfer from the primary site to the secondary site of an asynchronous remote copy disaster recovery system.

BACKGROUND OF THE INVENTION

Data processing systems typically require a large amount of data storage. Effective data processing systems efficiently access, modify, and re-store data within the data storage. Data storage is typically separated into several different levels depending on the time to access the data or the cost to store the data. A first, or highest level of data storage involves electronic memory, usually dynamic or static random access memory (DRAM or SRAM). Electronic memories take the form of semiconductor integrated circuits wherein millions of bytes of data can be stored on each circuit, with access to such bytes of data measured in nanoseconds. The electronic memory provides the fastest access to data since access is entirely electronic.

A second level of data storage usually involves direct access storage devices (DASD). DASD storage, for example, can comprise magnetic and/or optical disks. Data bits are stored as micrometer sized magnetically or optically altered spots on a disk surface which represent the "ones" and "zeros" that comprise the binary value of the data bits. Magnetic DASD includes one or more disks that are coated with remnant magnetic material. The disks are rotatably mounted within a protected environment. Each disk is divided into many concentric tracks, or closely spaced circles. The data is stored serially, bit by bit, along each track. An access mechanism, known as a head disk assembly (HDA), typically includes one or more read/write heads, and is provided in each DASD for moving across the tracks to transfer the data to and from the surface of the disks as the disks are rotated past the read/write heads. DASDs can store gigabytes of data with the access to such data typically measured in milliseconds (orders of magnitudes slower than electronic memory). Access to data stored on DASD is slower due to the need to physically position the disk and HDA to the desired data storage location.

A third or lower level of data storage includes tapes, tape libraries, and DASD libraries. Access to data is much slower in a library since a robot is necessary to select and load the needed data storage medium. An advantage of these storage systems is the reduced cost for very large data storage capabilities, on the order of terabytes of data.

Tape storage is often used for back-up purposes. That is, data stored at the second level of the data storage hierarchy is reproduced for safe keeping on magnetic tape. Access to data stored on tape and/or in a library is presently on the order of seconds.

Having a back-up data copy is mandatory for many businesses as data loss could be catastrophic to the business. The time required to recover data lost at the primary storage level is also an important recovery consideration. An improvement in speed over tape or library back-up, includes dual copy. An example of dual copy involves providing additional DASD's so that data is written to the additional DASDs (sometimes referred to as mirroring). Then if the primary DASDs fail, the secondary DASDs can be depended upon for data. A drawback to this approach is that the number of required DASDs is doubled.

Another data back-up alternative that overcomes the need to provide double the storage devices involves writing data to a redundant array of inexpensive devices (RAID). In this configuration, the data is written such that the data is apportioned amongst many DASDs. If a single DASD fails, then the lost data can be recovered by using the remaining data and error correction procedures. Currently there are several different RAID configurations available.

The aforementioned back-up solutions are generally sufficient to recover data in the event that a storage device or medium fails. These back-up methods are useful only for device failures since the secondary data is a mirror of the primary data, that is, the secondary data has the same volume serial numbers (VOLSERs) and DASD addresses as the primary data. System failure recovery, on the other hand, is not available using mirrored secondary data. Hence still further protection is required for recovering data if a disaster occurs destroying the entire system or even the site, for example, earthquakes, fires, explosions, hurricanes, etc. Disaster recovery requires that the secondary copy of data be stored at a location remote from the primary data. A known method of providing disaster protection is to periodically back-up data to tape, such as a daily or weekly basis. The tape is then picked up by a vehicle and taken to a secure storage area usually located kilometers from the primary data location. This back-up plan has problems: it could take days to retrieve the back-up data, additional data is lost waiting for the back-up data to be recovered, or the same disaster could also destroy the storage location. A slightly improved back-up method would transmit data to a back-up location each night. This allows the data to be stored at a more remote location. Again, some data may be lost between back-ups since back-up does not occur continuously, as in the dual copy solution. Hence, a substantial amount of data could still be lost and this may be unacceptable to some users.

More recently introduced data disaster recovery solutions include remote dual copy wherein data is backed-up not only remotely, but also continuously (either synchronously or asynchronously). In order to communicate duplexed data from one host processor to another host processor, or from one storage controller to another storage controller, or some combination thereof, a substantial amount of control data is required for realizing the process. A high overhead, however, can interfere with a secondary site's ability to keep up with a primary site's processing, thus threatening the ability of the secondary site to be able to recover the primary in the event a disaster occurs.

Disaster recovery protection for the typical data processing system requires that primary data stored on primary DASDs be backed-up at a secondary or remote location. The distance separating the primary and secondary locations depends upon the level of risk acceptable to the user, and can vary from several kilometers to thousands of kilometers. The secondary or remote location, in addition to providing a back-up data copy, must also have enough system information to take over processing for the primary system should the primary system become disabled. This is due in part because a single storage controller does not write data to both primary and secondary DASD strings at the primary and secondary sites. Instead, the primary data is stored on a primary DASD string attached to a primary storage controller while the secondary data is stored on a secondary DASD string attached to a secondary storage controller.

The secondary site must not only be sufficiently remote from the primary site, but must also be able to back-up primary data in real time. The secondary site needs to back-up primary data as the primary data is updated with some minimal delay. Additionally, the secondary site has to back-up the primary data regardless of the application program (e.g., IMS, DB2) running at the primary site and generating the data and/or updates. A difficult task required of the secondary site is that the secondary data must be order consistent, that is, secondary data is copied in the same sequential order as the primary data (sequential consistency) which requires substantial system considerations. Sequential consistency is complicated by the existence of multiple storage controllers each controlling multiple DASDs in a data processing system. Without sequential consistency, secondary data inconsistent with primary data would result, thus corrupting disaster recovery.

Remote data duplexing falls into two general categories, synchronous and asynchronous. Synchronous remote copy involves sending primary data to the secondary location and confirming the reception of such data before ending a primary DASD input/output (I/O) operation (providing a channel end (CE) and device end (DE) to the primary host). Synchronous copy, therefore, slows the primary DASD I/O response time while waiting for secondary confirmation. Primary I/O response delay is increased proportionately with the distance between the primary and secondary systems—a factor that limits the remote distance to tens of kilometers. Synchronous copy, however, provides sequentially consistent data at the secondary site with relatively little system overhead.

Synchronous remote copy for disaster recovery also requires that paired DASD volumes form a set. The DASD volumes at the secondary site essentially form a "duplex pair" with the corresponding DASD volumes at the primary site. Forming such a set further requires that a sufficient amount of system information be provided to the secondary site for identifying those DASD volumes which pair with DASD volumes at the primary site. The secondary site must also recognize when a DASD volume is "failed duplex", when a DASD at the secondary site is no longer synchronized with its primary site counterpart. The primary site can suspend remote copy to allow the primary site to continue transferring data updates while these updates are queued for the secondary site. The primary site marks these updates to show the secondary site is no longer synchronized.

Synchronous remote copy disaster recovery systems have the desired ability to suspend the remote copy pair and queue the updates to be subsequently transferred to the secondary site because of their synchronous design. The host application at the primary site cannot start the next I/O transfer to the primary storage controller until the previous I/O transfer has been synchronized at the secondary site. If the previous I/O was not successfully transmitted to the secondary site, the remote copy pair is suspended before the subsequent I/O transfer is started. Thus, the subsequent I/O transfers to this remote copy pair can be queued for later transmittal to the secondary site once the remote copy pair is re-established.

Asynchronous remote copy provides better primary application system performance because the primary DASD I/O operation is completed (providing a channel end (CE) and device end (DE) to the primary host) before data is confirmed at the secondary site. Therefore, the primary DASD I/O response time is not dependent upon the distance to the secondary site and the secondary site could be thousands of kilometers remote from the primary site. A greater amount of system overhead is required, however, for ensuring data sequence consistency since data received at the secondary site will often not be in order of the primary updates. A failure at the primary site could result in some data being lost that was in transit between the primary and secondary locations.

Further, certain errors in the data processing system at the primary site, either in the host application or in the storage subsystem, can cause the termination of the remote copy function. Unlike synchronous remote copy designs, the remote copy pair cannot be suspended. Once remote copy has been terminated, resumption of the remote copy function requires all data from the primary DASDs to be copied to the secondary DASDs to ensure re-synchronization of the two sites.

Thus, a mechanism in an asynchronous disaster recovery system is needed to track and record which data sets are in transit between the primary site and the secondary site. Having this information would notify the primary site which specific data sets need to be re-transferred to the secondary site after recovery from certain host application errors or DASD subsystem errors. The asynchronous disaster recovery system would no longer have to copy all the data from each primary DASD in the consistency group (updates to DASD maintained in a sequence consistent order) to its paired counterpart at the secondary site. Instead, only the particular tracks of data in the consistency group transferred from the primary site to the secondary site at the time of the error would need to be retransferred.

SUMMARY OF THE INVENTION

An object of the present invention is to provide a method and apparatus for marking which tracks of which DASDs within the asynchronous remote copy disaster recovery system have been updated in the current consistency group.

Another object of the present invention is to provide a method and apparatus for marking which tracks of which DASDs within the asynchronous remote copy disaster recovery system have been updated in the prior consistency group currently being transferred from the primary site to the secondary site.

A first embodiment of the present invention provides a method for marking record updates to particular tracks of specific DASDs within an asynchronous remote copy disaster recovery system. A pair of track arrays is provided for each primary DASD of a remote copy pair. The track array, or bit map, contains a bit representing each track or cylinder on the DASD.

A disaster recovery system for carrying out the method includes a primary site and a secondary site. The primary site includes a host processor running an application generating records and record updates, a primary data storage device of a remote copy pair, and a storage controller coupled between the host processor and the primary data storage device. The storage controller contains the pair of track arrays for the primary data storage device of the remote copy pair. The secondary site includes a host processor running an application generating records and record updates, a secondary data storage device of a remote copy pair, and a storage controller coupled between the host processor and the secondary data storage device.

The method uses one track array to mark which tracks of the primary data storage device are updated by the host application. The method uses the other track array to monitor the transfer of the current consistency group from the primary site to the secondary site. Once this transfer completes, the method clears the second track array. When a new consistency group is formed, the method freezes the contents of the first track array and toggles to the second, cleared track array. The first track array is now used to monitor the transfer of this new consistency group to the secondary site and the second track array marks subsequent updates from the host application.

In another embodiment of the present invention, a disaster recovery system includes a primary site and a secondary site. The primary site has a primary host processor running one or more applications and having a primary data mover. The applications generate record updates and the primary primary data mover forms consistency groups comprising copies of said record updates in sequence consistent order to be transferred from the primary site to the secondary site. The primary site further includes a primary data storage device having tracks for storing said record updates and a primary storage controller coupled between the primary host processor and the primary data storage device. The primary site marks in a track array which tracks of the primary data storage device are updated by the host application. The primary site maintains the other track array to monitor the transfer of the current consistency group from the primary site to the secondary site. The disaster recovery system further includes a secondary site having a secondary host processor communicating with said primary host processor, a secondary data storage device having tracks for storing the consistency group, and a secondary storage controller coupled between said secondary host processor and said secondary data storage device.

The foregoing and other objects, features, and advantages of the invention will be apparent from the following more particular description of a preferred embodiment of the invention, as illustrated in the accompanying drawings.

DETAILED DESCRIPTION OF THE INVENTION

A typical data processing system may take the form of a host processor, such as an IBM System/370 or IBM System/390 processor for computing and manipulating data, and running, for example, data facility storage management subsystem/multiple virtual systems (DFSMS/MVS) software, having at least one IBM 3990 storage controller attached thereto. Typically, the storage controller includes a memory controller and one or more cache memory types incorporated therein. The storage controller is further connected to a group of direct access storage devices (DASDs) such as IBM 3380 or 3390 DASDs. While the host processor provides substantial computing power, the storage controller provides the necessary functions to efficiently transfer, stage/destage, convert and generally access large databases.

Asynchronous remote data shadowing is used when it is necessary to increase a distance between primary and secondary sites which, in turn, reduces the probability that a single disaster will corrupt both primary and secondary sites. Asynchronous remote copy is also used when primary application performance impact needs to be minimized. While the distance between primary and secondary sites can now stretch across the earth or beyond, the synchronization of write updates across multiple DASD volumes behind multiple primary subsystems to multiple secondary subsystems is substantially more complicated. Record write updates can be shipped from a primary storage controller via a primary data mover to a secondary data mover for shadowing on a secondary storage subsystem. But, the amount of control data passed between the primary and secondary sites must be minimized while still being able to re-construct an exact order of the record write updates on the secondary system. This is further complicated by the fact that the data originated from multiple DASDs behind several storage controllers at the primary site and must be transferred to multiple DASDs behind several storage controllers at the secondary site.

Figure 1:
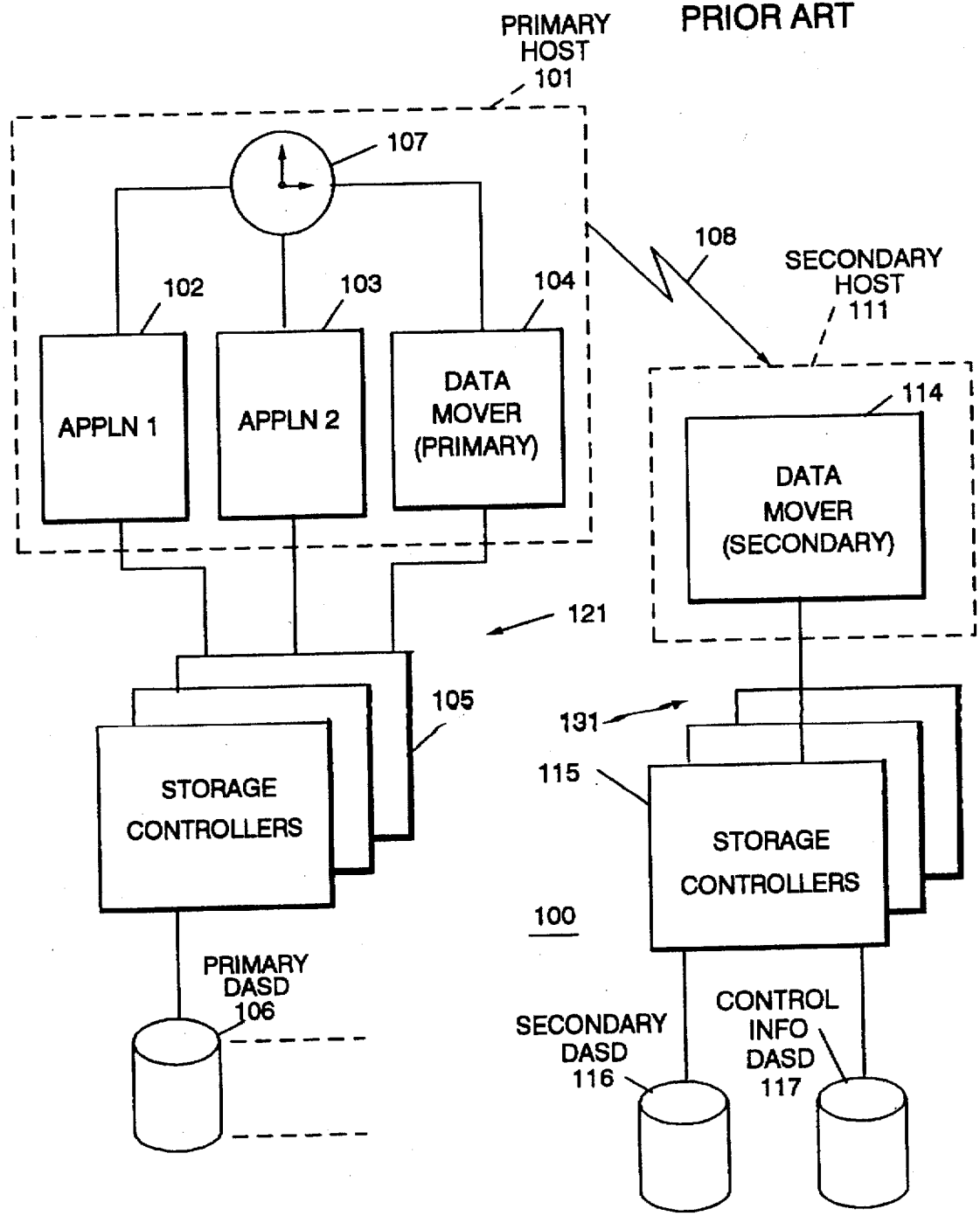
FIG. 1 is a block diagram of a data storage system having asynchronous remote copy capabilities and providing for disaster recovery.

Referring now to FIG. 1, this figure depicts an asynchronous disaster recovery system 100 including a primary site 121 and a remote or secondary site 131. The primary site 121 includes a primary processor 101, for example, an IBM ES/9000 running DFSMS/MVS host software. The primary processor 101 further includes application programs 102 and 103, for example, IMS and DB2 applications, and a primary data mover (PDM) 104. A common sysplex clock 107 is included in the primary processor 101 for providing a common reference to all applications (102, 103) running therein, wherein all system clocks or time sources (not shown) synchronize to the sysplex clock 107 ensuring all time dependent processes are properly timed relative to one another. The primary storage controllers 106, for example, synchronize to a resolution appropriate to ensure differentiation between record write update times, such that no two consecutive write I/O operations to a single primary storage controller 104 can exhibit the same time stamp value. The resolution, and not the accuracy, of the sysplex timer 107 is critical. The PDM 104, though shown connected to the sysplex timer 107, is not required to synchronize to the sysplex timer 107 since write I/O operations are not generated therein. A sysplex timer 107 is not required if the primary processor 101 has a single time reference (for example, a single multi-processor ES/9000 system).

A plurality of primary storage controllers 105, for example, IBM 3990 Model 6 storage controllers, are connected to the primary processor 101 via a plurality of channels, for example, fiber optic channels. Connected to each primary storage controller 105 is at least one string of primary DASDs 106, for example, IBM 3390 or RAMAC DASDs. The primary storage controllers 105 and the primary DASDs 106 form a primary storage subsystem. Each storage controller 105 and primary DASD 106 need not be separate units, but may be combined into a single drawer.

The secondary site 131, located for example, some thousands of kilometers remote from the primary site 121, similar to the primary site 121, includes a secondary processor 111 having a secondary data mover (SDM) 114 operating therein. Alternatively, the primary and secondary sites can be the same location, and further, the primary and secondary data movers can reside on a single host processor (secondary DASDs may be just over a fire-wall). A plurality of secondary storage controllers 115 are connected to the secondary processor 111 via channels, for example, fiber optic channels, as is known in the art. Connected to the storage controllers 115 are a plurality of secondary DASDs 116 and a control information DASD(s) 117. The storage controllers 115 and DASDs 116 and 117 comprise a secondary storage subsystem.

The primary site 121 communicates with the secondary site 131 via a communication link 108. More specifically, the primary processor 101 transfers data and control information to the secondary processor 111 by a communications protocol, for example, a virtual telecommunications access method (VTAM) communication link 108. The communication link 108 can be realized by several suitable communication methods, including telephone (T1, T3 lines), radio, radio/telephone, microwave, satellite, etc.

The asynchronous data shadowing system 100 encompasses collecting control data from the primary storage controllers 105 so that an order of all data writes to the primary DASDs 106 is preserved and applied to the secondary DASDs 116 (preserving the data write order across all primary storage subsystems). The data and control information transmitted to the secondary site 131, must be sufficient such that the presence of the primary site 121 is no longer required to preserve data integrity.

The applications 102, 103 generate data or record updates, which record updates are collected by the primary storage controllers 105 and read by the PDM 104. The primary storage controllers 105 each grouped its respective record updates for an asynchronous remote data shadowing session and provides those record updates to the PDM 104 via non-specific primary DASD 106 READ requests. Transferring record updates from the primary storage controllers 105 to the PDM 104 is controlled and optimized by the PDM 104 for minimizing a number of START I/O operations and time delay between each read, yet maximizing an amount of data transferred between each primary storage controller 105 and the primary processor 101. The PDM 104 can vary a time interval between non-specific READs to control this primary storage controller-host optimization as well as a currency of the record updates for the secondary DASDs 116.

Collecting record updates by the PDM 104, and transmitting those record updates to the SDM 114, while maintaining data integrity, requires the record updates to be transmitted for specific time intervals and in appropriate multiple time intervals with enough control data to reconstruct the primary DASDs 106 record WRITE sequence across all primary storage subsystems to the secondary DASDs 116. Reconstructing the primary DASDs 106 record WRITE sequences is accomplished by passing self-describing records from the PDM 104 to the SDM 114. The SDM 114 inspects the self-describing records for determining whether any records for a given time interval have been lost or are incomplete.

Figure 2:
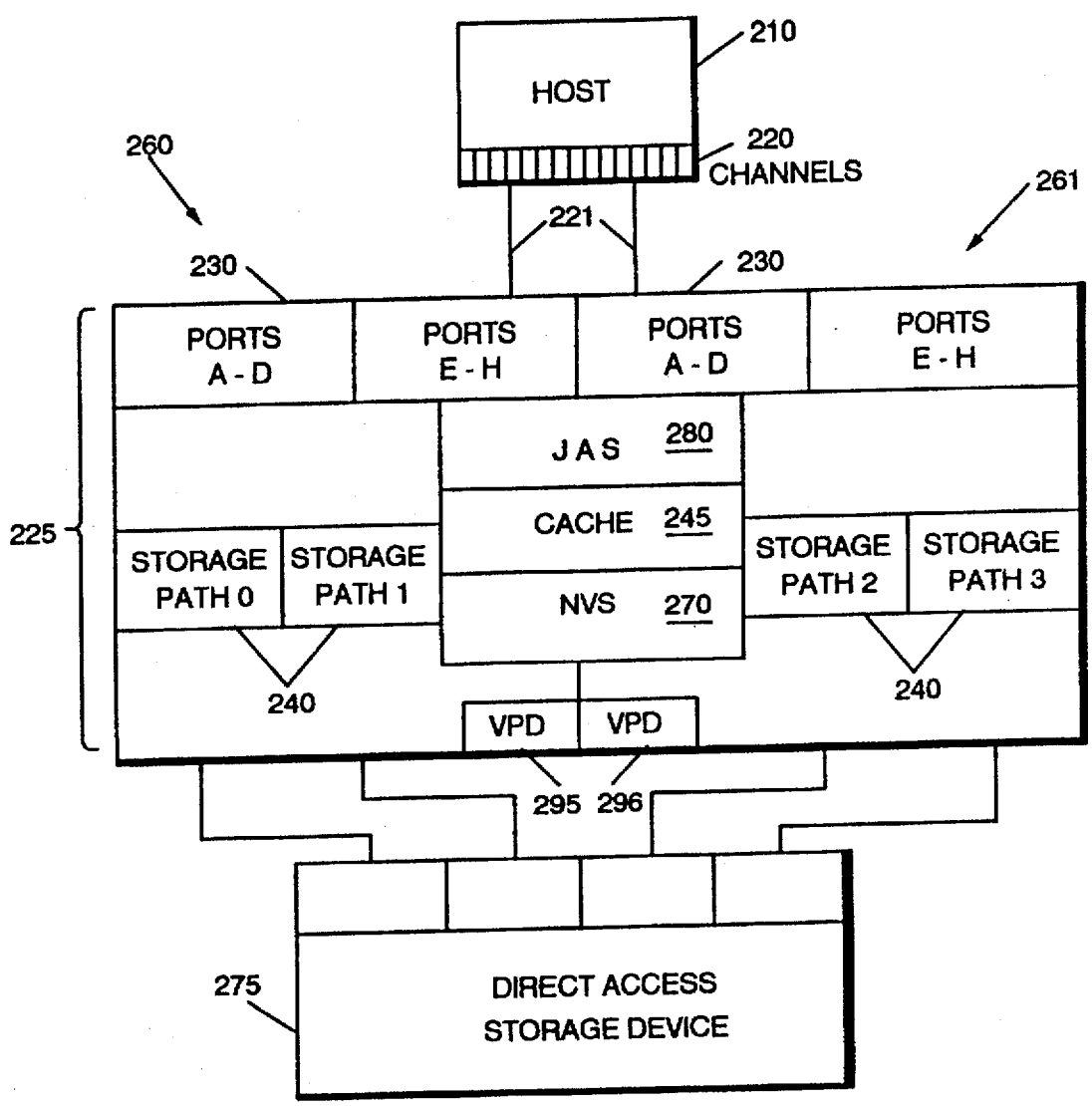
FIG. 2 is a block diagram showing a storage controller in greater detail as connected in a data storage system.

Referring to FIG. 2, a storage controller 225, for example an IBM 3990 storage controller, is shown in greater detail as connected to a data processing system including a host processor 210, such as an IBM System/370 or IBM Enterprise Systems/9000 (ES/9000) processor running, for example, data facility storage management subsystem/multiple virtual systems (DFSMS/MVS) software. The storage controller 225 is further connected to a direct access storage device (DASD) 275, such as an IBM 3390 or RAMAC DASD. A storage subsystem is formed by the storage controller 225 and DASD 275. The storage subsystem is connected to the host processor 210 via communication links 221, wherein the communication links 221 connect to channels 220 of the host processor 210 and to ports A–D, E–H 230 of the storage controller 225. The communication links 221 can be either parallel or serial links, for example, enterprise system connections (ESCON) serial fiber optic links.

The storage controller 225 includes dual clusters 260 and 261, the dual clusters 260, 261 having separate power supplies (not shown) and further including ports A–D, E–H 230 for providing a communication interface thereto. Both non-volatile storage (NVS) 270 and cache 245 are provided for temporary data storage and are accessible to both clusters 260, 261. Storage paths 0–3 240 provide necessary paths to the DASD 275. Vital product data is maintained in VPDs 295 and 296. A storage controller, similar to the storage controller 225 is described in U.S. Pat. No. 5,051,887, assigned to the assignee of the present invention, and is hereby incorporated by reference.

Figure 3:
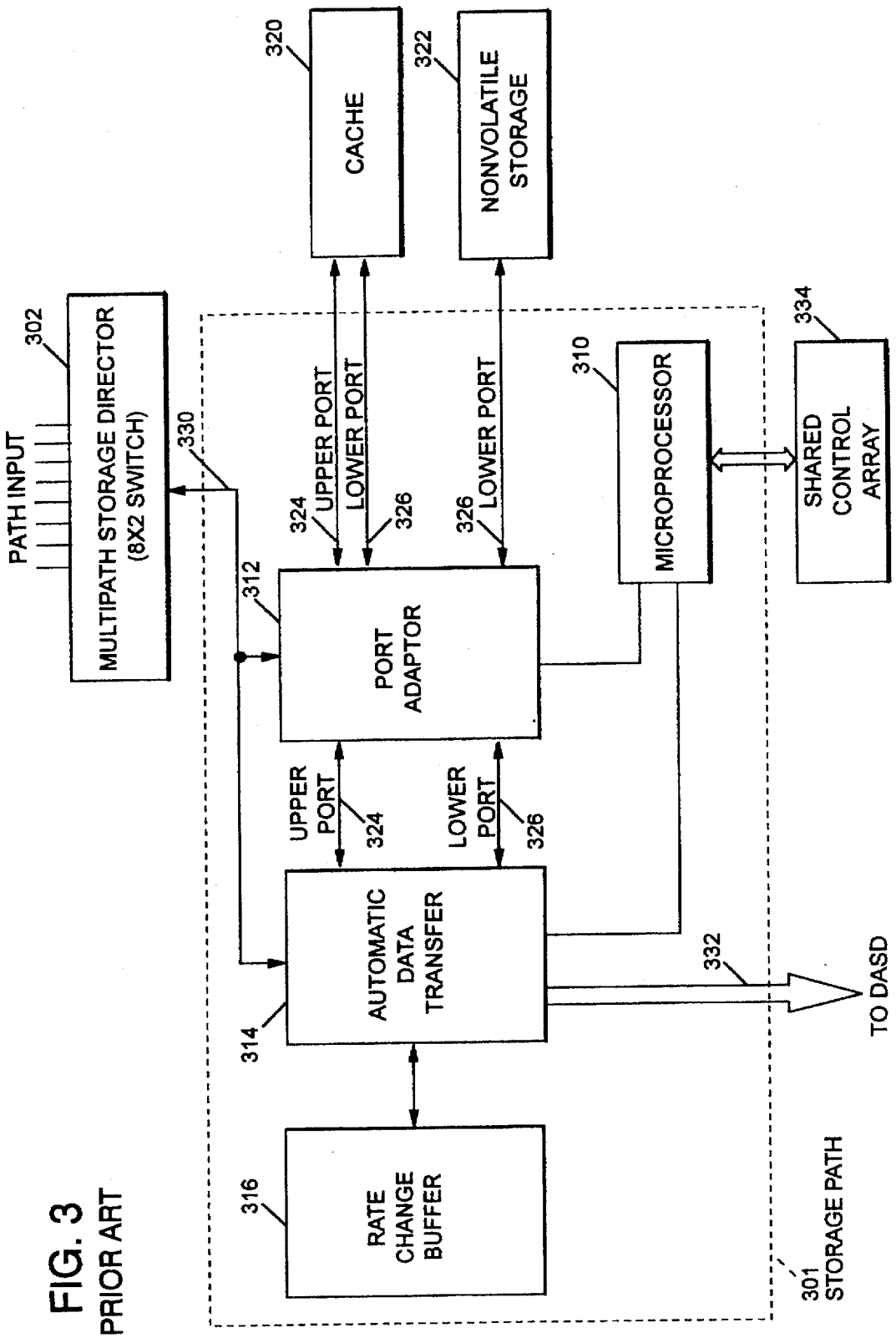
FIG. 3 is a block diagram showing a storage path in greater detail as connected in a storage controller in a data storage system.

FIG. 3 shows a storage path 301 of the storage controller in greater detail. As shown earlier in FIG. 2, the storage controller contains four storage paths, each storage path being identical to the other three. Thus, only one storage path will be described in detail. The storage path 301 is connected to an 8×2 switch 302 by an upper channel port 330 and to a plurality of DASDs by a lower device port 332. The storage path 301 contains a microprocessor 310 which controls all operations taking place within the storage path 301. The microprocessor 310 is capable of interpreting channel commands received from the host processor as well as controlling the attached DASDs. The microprocessor 310 executes microinstructions loaded into a control memory, or control store (not shown), through an external support facility.

A shared control array (SCA) 334 is also shown in FIG. 3. The SCA contains information shared by all four storage paths of the storage controller. Each microprocessor 310 in the storage path 301 accesses the SCA 334 to obtain shared information. Typical shared information includes certain external registers used by the microprocessors of all four storage paths, device status, and channel reconnection data.

The storage path 301 also contains a port adaptor (PA) 312 which provides data paths and control lines for the transfer of data between cache 320, non-volatile storage (NVS) 322, and an automatic data transfer (ADT) buffer 314, 316. The ADT buffer consists of an ADT circuit 314 and a rate change buffer 316. The rate change buffer 316 compensates for differences between the data transfer rate of the DASD and the host processor to channel connection. Typically in data processing systems, data transfer rates between a channel and a storage controller, or channel transfer rates, are much higher than data transfer rates between a DASD and a storage controller, or DASD transfer rates.

The port adaptor 312 uses an upper cache port 326 and a lower cache port 328 to provide the data paths between the cache 320, NVS 322, and ADT buffer 314, 316. These two ports allow for two simultaneous transfers involving the cache 320. For example, data can be transferred from the cache 320 to the channel using the upper cache port 324 at the same time data is transferred from the DASD to the cache 320 using the lower cache port 326. Data transfer is initialized by the microprocessor 310 and then once started is controlled by the ADT circuit 314 without microprocessor intervention until completion.

The storage path 301 directs the transfer of data records from the host processor to one of the plurality of DASDs during direct DASD operations, caching operations, or fast write operations. Direct DASD operations involve the transfer of data between the host processor and one of the plurality of DASDs without using cache or NVS for temporary storage of the data. In this case, the storage path 301 uses the ADT buffer 314, 316 to temporarily store the data for transfer to the DASD.

During caching operations, the storage path 301 stores the data in the cache memory 320 and branches the data to the DASD. In this case, the data is transferred into the ADT buffer 314, 316 using the upper channel port 330. The data is then transferred from the ADT buffer 314, 316 to the cache memory 320 using the upper cache port 324 and to the DASD using the lower device port 332. The data remains in the cache memory 320 for a time interval after it is branched to the DASD. If the host processor requests to read the data before it is updated, the storage path 301 can direct the data to be read from the cache 320 thereby increasing the performance of the data processing system.

During fast write operations, the storage path 301 initially stores the data into cache 320 and NVS 322. The data is then destaged from NVS 322 to the DASD at a later time. In this fast write case, the data is transferred into the ADT buffer 314, 316 using the upper channel port 330. The data is then transferred from the ADT buffer 314, 316 to cache 320 using the upper cache port 324 and to NVS 322 using the lower cache port 326. As with caching operations, if the host processor requests to read the data before it is updated, the storage path 301 can direct the data to be read from the cache 320 thereby increasing the performance of the data processing system.

Figure 4:
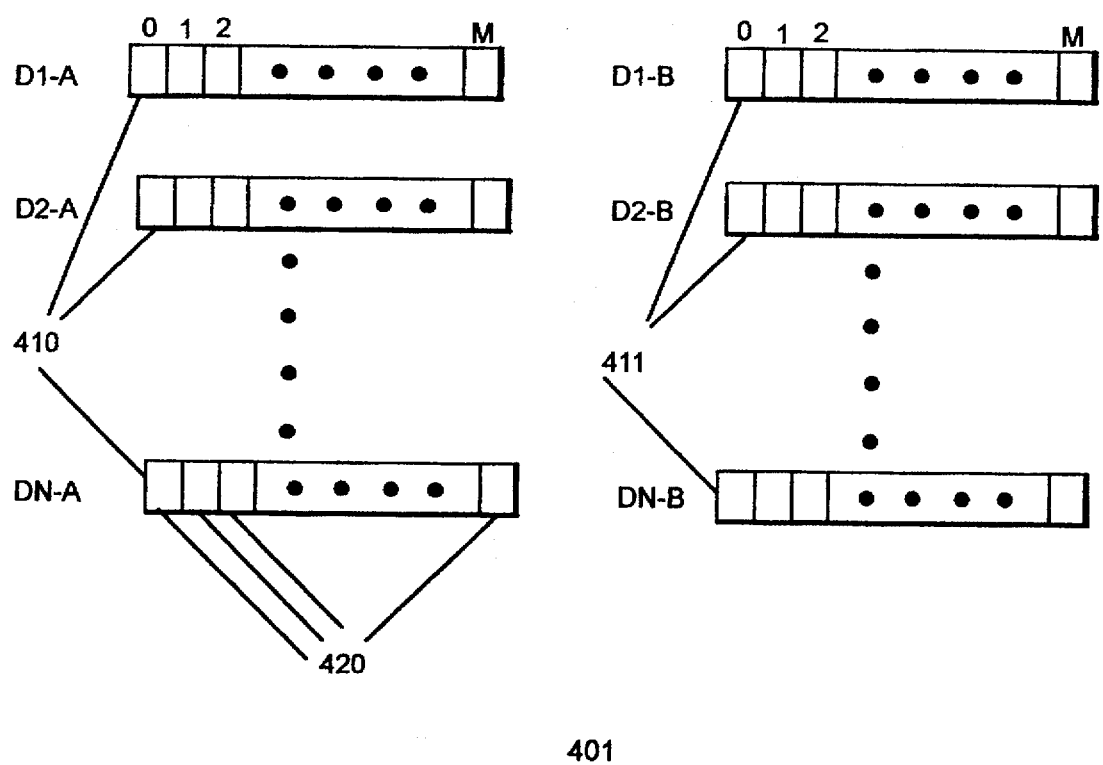
FIG. 4 is a block diagram showing a pair of track arrays, or bit maps, in accordance with the present invention, for several devices in the data storage system.

Referring to FIG. 4, a pair of track arrays 410, 411, or bit maps, is shown for several data storage devices numbered from 1 to N. Each track array is M bits 420, 421 wide representing a maximum of M tracks, or cylinders, worth of data for each data storage device numbered 1 to N. Thus, leftmost bit 420, bit 0, of the track arrays 410, 411 identified as D1-A and D1-B corresponds to track 0 of data storage device with address 1. The binary value of this bit denotes whether the particular track of the specific data storage device has been updated in the appropriate time interval represented by track array A or B 410, 411. In all, the entire bit map for all data storage devices is 2×M bits by N devices, or two tables M wide by N long.

Figure 5:
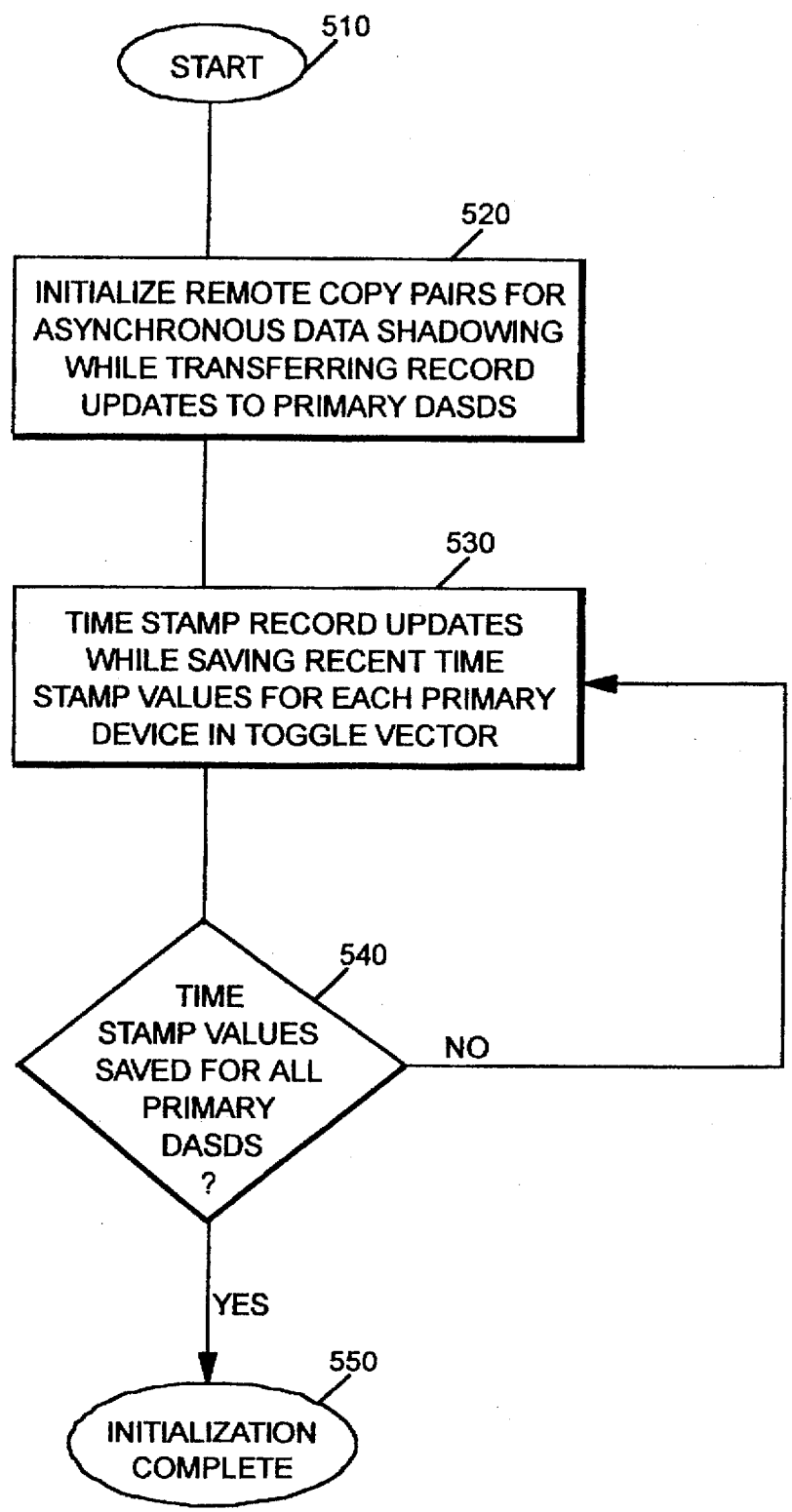
FIGS. 5 and 6 are flow diagrams describing a method, according to the present invention, for marking which track of the primary DASD receives a record update from the primary host processor and subsequently using the mark when the record update is sent in a consistency group from the primary site to the secondary site of a disaster recovery system.

Referring to FIG. 5, a flow diagram is shown describing the method by which the change marking process begins with initiation of asynchronous remote copy. The method uses a pair of track arrays, or bit maps, for each primary data storage device of a remote copy pair. Each track array contains one element for every track, or cylinder, on the primary data storage device. An any given instant, one of the track arrays is the "active array" recording changes to the device's tracks and the other is a retained change marking array from earlier times when that second array was the active array. Initially at step 520, the host processor is transferring record updates to the primary DASDs and the DASD update addresses are being captured in the initial active marking array. The second array for each device is idle and empty.

Step 520 shows the initial copy of storage volumes to their corresponding secondary DASDs. Step 530 shows the action of creating the first retained change address array (via a "toggle" command) once all preexisting data on the remote copy primary devices has been initially copied to secondary devices. Also at step 530, the time stamp that each device effects this toggle is reported to the data mover and retained in a nonvolatile storage toggle time vector for future use. Step 540 waits for all copy devices to complete their initial toggle command. At the completion of 540, all devices are marking changes in an active change array and all devices have a retained changes array.

Figure 6:
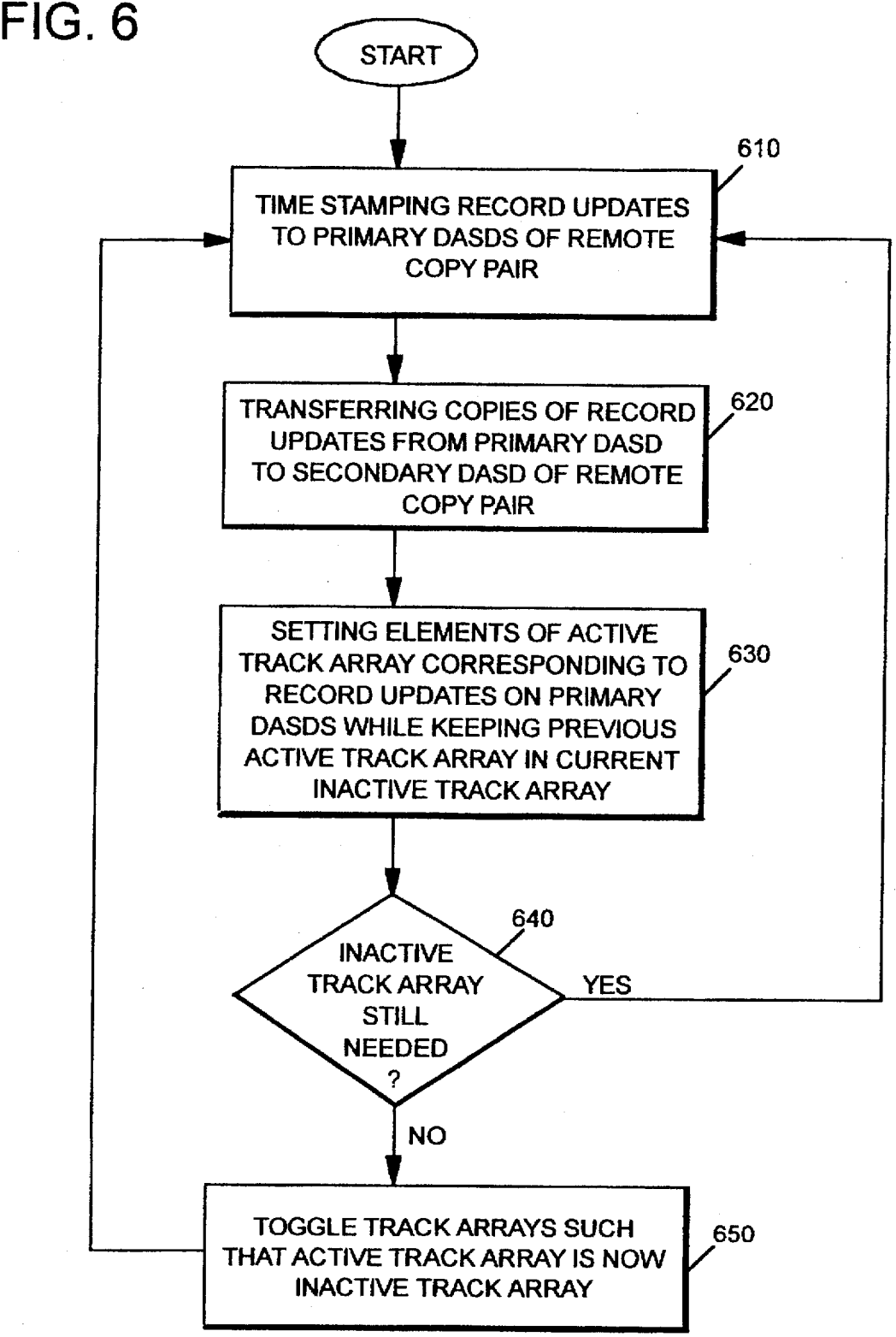

Referring to FIG. 6, a flow diagram is shown describing the method by which the change arrays are managed during normal asynchronous remote copy operation. Managing the arrays is a process of tracking the progress of the copying of current updates to DASD, recognizing when the change marking content in retained arrays is no longer required for recovery of the copy processes, and toggling the two array assignments for each device between active accumulation and retained content.

A step 610 is provided for transferring record updates from the primary host processor to the primary DASD. Step 610 further time stamps record updates transferred from the primary host processor to the primary DASD using the sysplex timer of the primary host processor. Step 620 transmits copies of the record updates transferred to the primary DASDs from the primary site to the secondary site. These copied record updates are stored on the secondary DASDs of the remote copy pair.

Step 630 sets a bit in one of the pair of track arrays, denoted the active track array, to mark which track of the corresponding data storage device receives the record update. Current track updates to the primary data storage device are marked in one of the pair of track arrays at the time the host application transfers the data. Step 630 uses a second track array, denoted the recovery track array, to monitor the consistency group transfer. The recovery track array designates which tracks of the primary DASD where updated and collected into the consistency group currently in transit between the primary and secondary site. Step 640 decides when the record track array is no longer needed because all the copied record updates have been successfully transferred to the secondary site. If the recovery track array is still needed, additional record updates can be transferred from the primary host processor. If the recovery track array is no longer needed, step 560 clears the record track array and then toggles the track arrays for each primary DASD of each remote copy pair, such that the recovery track array becomes the active track array and vice versa.

This new recovery track array indicates the record updates in transit between the primary site and the secondary site. If an error occurs that requires the data to be retransferred from the primary to the secondary site, the recovery track array for each primary DASD indicates which tracks need to be resent from that particular primary DASD. Once a group of copied record updates, sometimes referred to as a consistency group, is successfully transferred from the primary site to the secondary site, a new group of copied record updates can be formed and transferred to the secondary site. When this occurs, the method again toggles between the track arrays and the cycle repeats.

Figure 7:
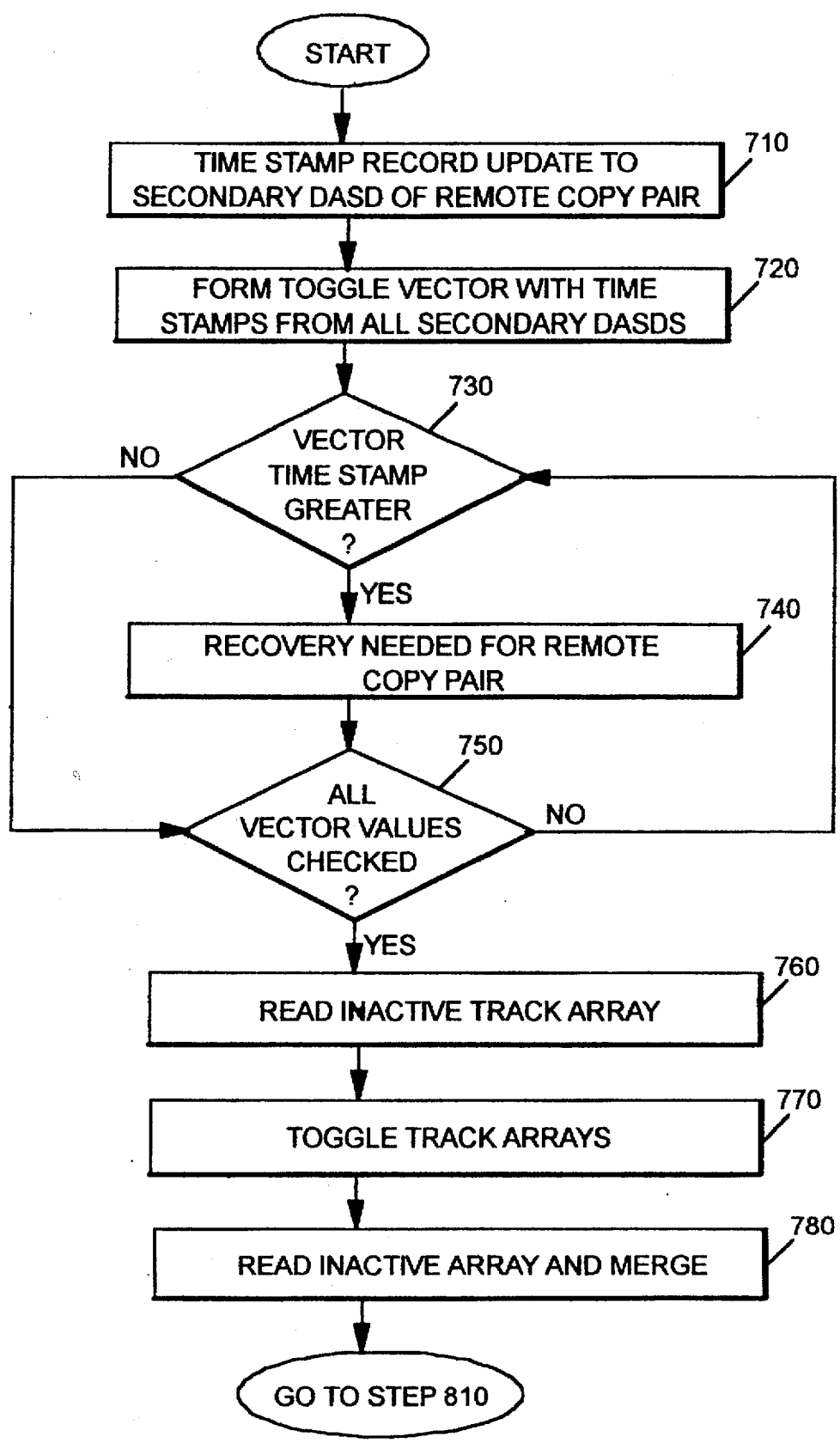
FIGS. 7 and 8 are flow diagrams describing a method, according to the present invention, for recovering record updates between the primary site and the secondary site of the disaster recovery system using track arrays.

In FIG. 7, the use of the change marking arrays to effect recovery of all possible lost updates during copy process recovery is shown. Copy process recovery, step 710, may be started selectively for one or more DASD subsystems or for the entire copy process, depending on the scope of the failure that might have lost copy update data. The recovery process use of change marking begins at 710 by obtaining the time stamp of the last completed update on secondary DASD. The data mover then constructs an initial toggle time vector by obtaining the last toggle time for each device from the device or from previously saved nonvolatile storage. At step 730, the toggle vector time values for each device are compared with the last secondary update value from step 720 to identify devices for which recovery will be required from that device's recovery track array. Devices that have a toggle vector time value greater than the time value from 720 have record of changes in the recovery track array that identify data to be read from the device and recopied to secondary DASD.

Step 740 builds a vector, or list, of devices for which recovery from the retained array change information will be required. Step 750 cycles through steps 730 and 740 to complete the recovery device vector started in 740. At step 760, the data mover reads the recovery track array for those devices in the recovery device vector. At step 770, the data mover toggles the track arrays for all primary DASDs. At step 780, the data mover reads the recovery track array information from all primary DASDs. For devices with arrays read in step 760, the data mover merges the array content to form a single track array for each device.

Figure 8:
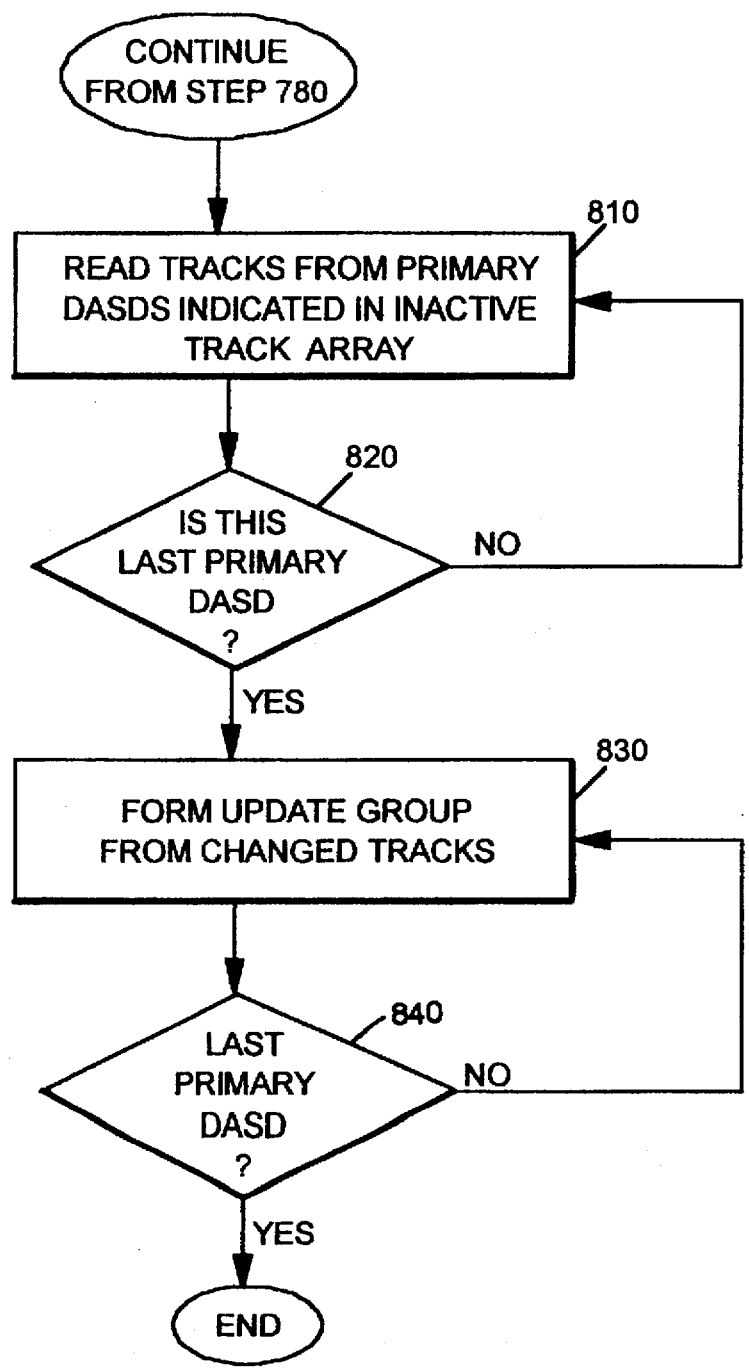

In FIG. 8, the recovery process continues at 810 where the data mover reads changed tracks from each primary DASD of the remote copy pair, the tracks to be read having been identified in step 780. Step 820 causes step 810 to be performed for each primary DASD. At step 830, the data read is merged by time stamp value with any current changed data. The data read in step 810 is used as a base. Any current changes with time stamps less than the toggle time stamp for the device being discarded are merged into the base. The merged data for each primary DASD is joined to form a current copy set. Step 840 iterates step 830 for each primary DASD to create the merged copy set.

Figure 9:
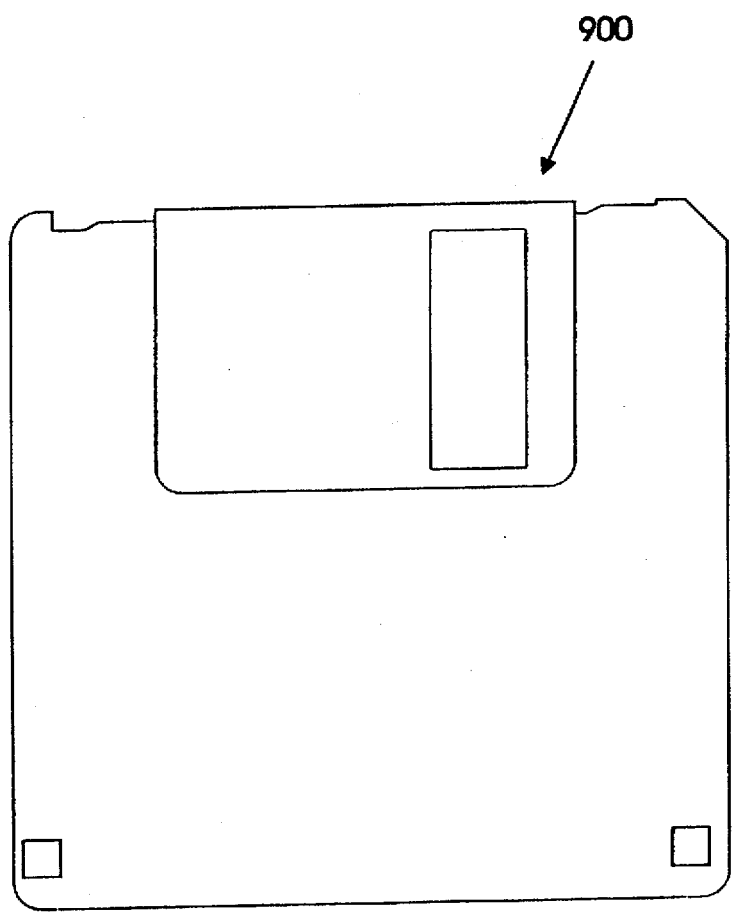
FIG. 9 is a block diagram representing a storage medium or memory for storing computer executable instructions.

FIG. 9 depicts a storage medium 900 for storing executable computer instructions, such as a magnetic diskette, an optical disk cartridge, or a magnetic tape cartridge. This figure also represents memories used to store executable computer instructions, such as read-only memory (ROM) or programmable memory (PROM). The requirement for these storage mediums or memories is that they store digital representations of computer executable instructions.

While the invention has been particularly shown and described with reference to preferred embodiments thereof, it will be understood by those skilled in the art that various changes in form and details may be made therein without departing from the spirit and scope of the invention. For example, track arrays, or bit maps, have been used to describe the means for identifying the data records in transit between the primary site and the secondary site. An equivalent means, other than bit maps, could be for identifying the updated records transferred in the consistency group. Also, the track arrays, or bit maps, have been described as located in the storage controller. The track arrays, or bit maps, could be located within the host processor, such as the primary data mover. In addition, the storage devices are not meant to be limited to DASD devices.

What is claimed is:

1. In a remote data shadowing system including a primary site and a secondary site, said secondary site asynchronously shadowing record updates of said primary site in real time for disaster recovery purposes, said record updates generated by applications running at said primary site, a method in said primary site for marking record updates transferred to a primary data storage device comprising steps of:

(a) time stamping said record updates using a common system timer in said primary site, said record updates transferred from a primary host processor running said applications to said primary data storage device;

(b) transferring copies of said record updates using a primary data mover running within said primary host processor to a secondary host processor at said secondary site, said secondary host processor communicating with said primary host processor, said copies of said record updates transferred in a sequence according to said time stamping and stored in a secondary data storage device coupled to said secondary host processor;

(c) updating data elements within a first and second track array for said primary data storage device, each element within said first and second track array corresponding to a data track within said primary data storage device, said first track array initially setting elements according to said corresponding data tracks on said primary data storage device receiving record updates transferred from said primary host processor, said second track array initially retaining elements previously set and indicating that copies of said record updates are currently being transferred from said primary site to said secondary site;

(d) said primary data mover determining when said transferring of said copies of record updates is complete and said elements of said second track array no longer need to be retained; and (e) toggling said updating of said first track array and said second track array for said primary data storage device, said second track array subsequently setting elements according to said corresponding data tracks on said primary data storage device receiving record updates transferred from said primary host processor, said first track array subsequently retaining elements previously set and indicating that copies of said record updates will be subsequently transferred from said primary site to said secondary site.

2. The method of claim 1 wherein the step (c) is performed by a primary storage controller coupled between said primary host processor and said primary storage device.

3. The method of claim 2 wherein the step (e) is performed by a primary storage controller coupled between said primary host processor and said primary storage device.

4. The method of claim 1 wherein the step (c) is performed by said primary data mover running in said primary host processor.

5. The method of claim 4 wherein the step (e) is performed by said primary data mover running in said primary host processor.

6. The method of claim 4 wherein the step (e) further comprises clearing all elements in said second track array before setting elements in said second track array according to said corresponding tracks of said primary data storage device receiving subsequent record updates transferred from said primary host processor.

7. In a data processing system providing remote data shadowing for disaster recovery purposes, said data processing system including a primary site and a secondary site, said primary site having a primary host processor running applications generating record updates, said primary host processor having a primary data mover transferring copies of said record updates to said secondary site for data shadowing, a primary data storage device having tracks for storing said record updates, and a primary storage controller coupled between said primary host processor and said primary data storage device, said data processing system further including a secondary site having a secondary host processor communicating with said primary host processor, a secondary data storage device having tracks for storing said copies of said record updates stored on said primary data storage device, and a secondary storage controller coupled between said secondary host processor and said secondary data storage device, said primary storage controller for marking record updates to said tracks on said primary data storage device comprising:

a first memory for storing a first and a second track array, each track array including an element corresponding to each said track on said primary data storage device;

a storage path coupled to said first memory for directing record updates between said primary host processor and said primary data storage device, said storage path setting elements in said first track array according to said track on said primary storage device receiving said record updates transferred from said primary host processor, said storage path further directing record updates from said primary data storage device to said primary host processor in response to said primary data mover transferring said copy of said record update from said primary site to said secondary site, said storage path maintaining said second track array retaining elements previously set for said transfer of said copy of said record update to said secondary site, and said storage path toggling said first and second track arrays for said primary data storage device in response to said primary data mover determining said second track array is no longer needed; and a second memory coupled to said storage path for storing said copies of said record updates to be transferred to said primary host processor.

8. The storage controller in claim 7 wherein said first memory is a cache memory and said elements are bits in said cache memory.

9. The storage controller in claim 7 wherein said second memory is a cache memory.

10. The storage controller in claim 7 wherein said first memory is a non-volatile storage and said elements are bits in said non-volatile storage.

11. A remote data shadowing system including a primary site and a secondary site, said secondary site asynchronously shadowing record updates of said primary site in real time for disaster recovery purposes, said record updates generated by applications running at said primary site, said primary site comprising:

a common system timer;

a primary host processor running said applications generating said record updates and having a primary data mover for transferring copies of said record updates from said primary site to said secondary site;

a primary data storage device having tracks for storing said record updates;

a primary storage controller coupled between said primary host processor and said primary data storage device, said primary storage controller including a memory for initially storing said record updates transferred from said host processor, said primary storage controller directing movement of said record updates between said primary host processor and said primary data storage device through said memory, said primary storage controller further directing transfer of said copies of said record updates to said primary host processor in response to said primary data mover;

a first track array having an element corresponding to each said track on said primary data storage device, said first track array initially setting elements according to said tracks on said primary data storage device receiving record updates transferred from said primary host processor;

a second track array having an element corresponding to each said track on said primary data storage device, said second track array initially retaining elements previously set for said transfer of said copies of said record updates from said primary site to said secondary site; and a means for toggling between said first track array and said second track array when marking said record updates transferred to said primary data storage device.

12. The remote data shadowing system in claim 11 wherein said first and said second track array are in said primary host processor.

13. The remote data shadowing system in claim 12 wherein said toggling means is in said primary host processor.

14. The remote data shadowing system in claim 11 wherein said first and said second track array are in said memory of said primary storage controller.

15. The remote data shadowing system in claim 14 wherein said memory in said primary storage controller is a cache memory.

16. The remote data shadowing system in claim 14 wherein said toggling means is in said primary storage controller.

17. The remote data shadowing system in claim 11 further comprising a non-volatile storage (NVS) in said primary storage controller coupled to said storage path, said NVS containing said first and said second track array.

18. An article of manufacture for use in a remote data shadowing system including a primary site having a primary processor coupled to a primary data storage device, and a secondary site having a secondary processor communicating with said primary processor and coupled to a secondary data storage device, said secondary site asynchronously shadowing record updates of said primary site in real time for disaster recovery purposes, said article of manufacture comprising a computer-readable storage medium tangibly embodying a program of executable computer instructions which may cause said primary processor to:

(a) time stamp said record updates using a common system timer in said primary site, said record updates generated by applications running in said primary processor and transferred from said primary processor to said primary data storage device;

(b) transfer copies of said record updates using a primary data mover running within said primary processor to said secondary host processor, said copies of said record updates transferred in a sequence according to said time stamping and stored in said secondary data storage device;

(c) update data elements within a first and second track array for said primary data storage device, each element within said first and second track array corresponding to a data track within said primary data storage device, said first track array initially setting elements according to said corresponding data tracks on said primary data storage device receiving record updates transferred from said primary host processor, said second track array initially retaining elements previously set and indicating which copies of said record updates are currently being transferred from said primary site to said secondary site;

(d) determine, using said primary data mover, when said transferring of said copies of record updates is complete and said elements of said second track array no longer need to be retained; and (e) toggle said updating of said first track array and said second track array for said primary data storage device, said second track array subsequently setting elements according to said corresponding data tracks on said primary data storage device receiving record updates transferred from said primary host processor, said first track array subsequently retaining elements previously set and indicating which copies of said record updates will be subsequently transferred from said primary site to said secondary site.

* * * * *